US005905798A

United States Patent [19]

Nerlikar et al.

[11] Patent Number: 5,905,798

[45] Date of Patent: May 18, 1999

[54] TIRIS BASED KERNAL FOR PROTECTION OF "COPYRIGHTED" PROGRAM MATERIAL

[75] Inventors: Madhu V. Nerlikar, Plano; Roy I. Edenson, Richardson, both of Tex.

[73] Assignee: Texas Instruments Incorporated, Dallas, Tex.

[21] Appl. No.: 08/850,535

[22] Filed: May 2, 1997

Related U.S. Application Data

[60] Provisional application No. 60/016,745, May 2, 1996.

[51] Int. Cl.$^{6}$ .......... G11B 23/28

[52] U.S. Cl. .......... 380/3; 380/4; 360/60

[58] Field of Search .......... 380/3, 4, 49; 348/5.5; 369/58, 14; 360/60

[56] References Cited

U.S. PATENT DOCUMENTS

| | | | |
|---|---|---|---|
| Re. 35,839 | 7/1998 | Asai et al. | 380/3 |
| 4,864,494 | 9/1989 | Kobus, Jr. | 364/200 |
| 5,394,469 | 2/1995 | Nagel et al. | 380/4 |
| 5,473,687 | 12/1995 | Lipscomb et al. | 380/4 |
| 5,592,549 | 1/1997 | Nagel et al. | 380/4 |
| 5,659,613 | 8/1997 | Copeland et al. | 380/3 |
| 5,680,459 | 10/1997 | Hook et al. | 380/23 |
| 5,754,648 | 5/1998 | Ryan et al. | 380/4 |
| 5,809,545 | 9/1998 | Ozaki et al. | 711/164 |

FOREIGN PATENT DOCUMENTS

| | | |
|---|---|---|
| 4403206 | 8/1995 | Germany . |

OTHER PUBLICATIONS

FELICA—Remote Card System—Sony Remote Card System, Next Generation for Contactless Smartcard, SONY—Sony Corporation, Tokyo, 141, Japan.

*Primary Examiner*—Eric W. Stamber
*Assistant Examiner*—Trevor Coddington
*Attorney, Agent, or Firm*—Rebecca Mapstone Lake; Richard L. Donaldson

[57] ABSTRACT

The invention consists of attaching or embedding a "TIRIS" transponder (or other RF or IR or barcode or other identifying device) physically into the center of the proposed DVD disk. Within the memory of the transponder, both a predetermined address and a code word are preprogrammed into the transponder at the manufacturing level of the media product. The media player not only comprises functionality to play the disk, but also comprises the functionality to transmit an interrogation signal to the transponder, and then to receive the transponder response signal. Therefore, once a disk is input to a media player, the interrogation portion of the media player transmits an interrogation signal to the transponder located on the disk. Thus once empowered with the interrogation signal, the transponder accesses the predetermined address and the code word from it's memory. Then the transponder transmits both the address and the code word to the interrogator, located within the media player, and the player accesses the particular address location on the disk. The media player only plays if there is a match between the read data-word and received code word. The comparison can occur within the interrogation portion of the media player or within the media player itself.

8 Claims, 2 Drawing Sheets

TIRIS ENCODING SCHEME (CODE WORD & DATA-WORD)
TIRIS
0.6/1.2MM
TIRIS DIRECTED ADDRESS & CODE WORD DATA-WORD
TIRISCYPHER™
EMBEDDED TIRIS DISC
DVD/CD/SW DISK
SAMPLE CODE DATA/WORD
256 BIT WIDE
32 BITS | 160 BITS | 64 BITS
-SKU, -BRAND -ORIGIN DATA -SERIAL / BATCH #
64 BIT - ADDRESS λ IN DVD
64 BIT - CODE WORD @ λ LOCATION
32 BIT - DECRYPTION SCHEME TO DECODE DVD DATA @ DVD ADDRESS FOR A MATCH.
64 BITS (REWRITABLE)
. RUN/USE COUNTER
. WRITE CYCLES
. USER / USAGE DATA
-PROFILE
-USAGE PATTERN

TIRIS BASED KERNAL FOR PROTECTION OF "COPYRIGHTED" PROGRAM MATERIAL

This application claims priority under 35 U.S.C. § 119 (e) (1) of provisional application Ser. No. 06/016,745, filed May 02, 1996, abandoned.

FIELD OF THE INVENTION

This invention relates in general to the use of RF-ID systems for security purposes and more specifically for securing the intellectual property value of copyrighted material.

BACKGROUND OF THE INVENTION

RF-ID systems are increasingly being used for more and a wider range of applications. In a typical RF-ID system, an interrogator transmits an interrogation TV signal, X to a transponder, within read range of the interrogator, and the transponder responds by transmitting it's identification number either by backscattering the interrogation signal, in a full duplex mode, or by the transponder actually transmitting it's identification signal after being powered up by the interrogation signal in a half duplex mode. RF-ID technology has found a niche in the security market. Transponders are easily attached to security badges, toll tags, or gate passes to allow/prohibit access or even provide automatic billing services, i.e. toll roads and parking garages, and readers are as readily constructed into toll booths, and doorways. On an even smaller scale, RF-ID systems can provide security and tracking capabilities for a wide variety of goods. Warehouses, libraries, and manufacturing plants are all potential venues with regard to the tracking aspect of RF-ID systems. However, with respect to the security aspect of RF-ID systems, the tracking and security of Secret or Top Secret government documents, is one of the areas which focuses on allowing or prohibiting access to a physical object, i.e. document. An even further extension from tracking and securing an object, is to allow only copyrighted objects, i.e. Digital Video Disk (DVD) and Digital Videocassette (DV) to be played on players, i.e. DVD players.

The current methodologies available for exercising copyright/anti-tape protections can be characterized as mostly deterrents constituting little more than "Warning Labels". This program material is mostly analog, "branded" multimedia content such as prerecorded VHS tapes of major studio motion pictures, CDs, cassettes, broadcast movies via cable/satellite channels, etc. Recording artists, major studios and the like have tolerated such inadequate safeguards because until recently the copied product resultant was degraded in quality sufficiently such that it could not duplicate the quality of the original Master material itself.

As digital content media replaces the analog content and gets rolled out in the next year or two, with the advent of Digital Video Disk (DVD) and Digital Videocassette, the content owners would like to see a better fool-proof technical approach to prevent unauthorized copying and redistribution of digital content media.

SUMMARY OF THE INVENTION

The system of protection described below offers additional potential benefits for all stakeholders in the value chain, including inventory control, pay-per-use pricing transactions, tiered level access control and demographic data gathering. The unique nature of the TIRIS cypher (Texas Instruments Registration and Identification System) approach enables new levels of sophistication in the control and tracking of packaged media material, in order to allow copyright owners to add greater value and protection. TIRIS cypher is a flat batteryless radio-frequency semiconductor transponder package which is bonded or embedded to the center of a copyrighted DVD media. Encrypted with a variety of information bits that can only be read with a TIRIS transceiver, located in the player, the disk is checked for authenticity.

The invention consists of attaching or embedding a "TIRIS" transponder (or other RF or IR or barcode or other identifying device) physically into the center of the proposed DVD disk. Within the memory of the transponder, both a predetermined address and a code word are preprogrammed into the transponder at the manufacturing level of the media product. The media player not only comprises functionality to play the disk, but also comprises the functionality to transmit an interrogation signal to the transponder, and then to receive the transponder response signal. Therefore, once a disk is input to a media player, the interrogation portion of the media player transmits an interrogation signal to the transponder located on the disk. Thus once empowered with the interrogation signal, the transponder accesses the predetermined address and the code word from it's memory. Then the transponder transmits both the address and the code word to the interrogator, located within the media player, and the player accesses the particular address location on the disk. The media player only plays if there is a match between the read data-word and received code word. The comparison can occur within the interrogation portion of the media player or within the media player itself.

The complete "TIRIS" cypher solution would also include any software/firmware algorithms needed to provide the secured access to only authorized users. In other words, both or either the codeword or the predetermined address may be encrypted within the transponder according to some predetermined algorithm preprogrammed at the manufacturing level or programmed by the customer. In the case of an encrypted codeword and address, both would then be decrypted by the interrogation section of the media player upon receipt of such. The corresponding interrogator would be embedded in the DVD player itself or any appliance involved in the "value chain". The "value-chain" comprising media production to final distribution at the retail level and on to the ultimate user. e.g. check-out lanes at retail/rental stores production lines of DVD media, DVD players, etc.

DETAILED DESCRIPTION OF THE PREFERRED EMBODIMENTS

A TIRIS-like transponder (flat and circular type . . . about 1" in diameter and about .=0.5 mm thick) can be implemented for various digital storage media) during media production phase. A single-page baseline transponder may have from 256 bits to 512 bits of memory. These bits may be allocated to store a media content specific, unique ID, serial number or BATCH number, along with an "encoded or encrypted" address location within the media itself. This disk address serves as a pointer to a specific data-word which is embedded anywhere within the disk's program material. This unique data-word contained on the disk within the digital data stream (not yet accessible to the viewer of the program content until after authentication is verified) is then compared with a preassigned code word located in the memory of the transponder itself. If there is a match between the media data-word and the TIRIS code word, authentication is complete, affording play access to the content.

Figure 1:
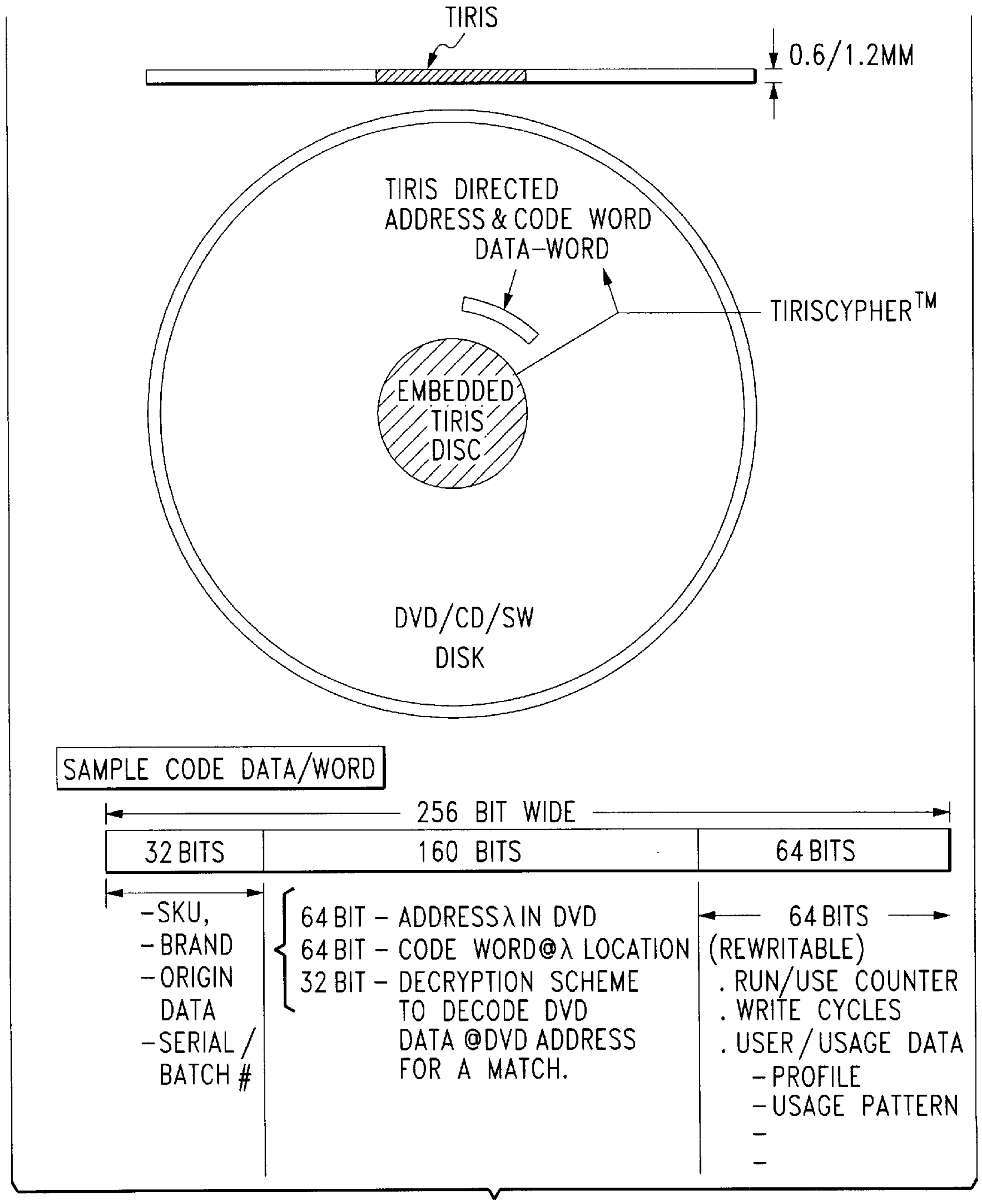
FIG. 1 shows a DVD/CD/SW disk with a TIRIS cypher transponder embedded within the center.

Additionally, a "check-sum" word may also be used in the authentication scheme to provide more levels of security. Look-up table access may be used to select pre-stored algorithms for data or address matching. An example of an intended bit allocation scheme is shown in FIG. 1. Note that in this example, the use of the first 32 bits of the transponder response datastream may comprise product tracking data which could provide detailed logging information regarding the manufacturing and inventory control of copyrighted material. Just some examples noted, are product SKU, Batch #, Date and Location Code.

The central 160 bits of data are dedicated to the 64 bit physical address of the data-word on the DVD itself and the next 64 bits are assigned to a TIRIS transponder code-word. The final 32 bits, shown for illustrative purposes only, may comprise a 32 bit code used in a decryption scheme if applicable, i.e. if the codeword and/or the predetermined address are encrypted by the transponder, the transponder may send an up to 32 bit decryption scheme with the encrypted codeword and/or predetermined address with which to allow the interrogator to decrypt. Continuing with this example, the last 64 bits (as shown in FIG. 1) could be reserved to contain post-manufactured rewritable data, such as the run/elapsed viewing time counter to count the number of times the media has been played or used, i.e. to enable pay-per-view pricing, or limit the number of authorized runs for a run-specific pricing, and also store the number of "write" cycles. More advanced readers could make use of these bits to provide remotely controlled polling capability, as the tracking of media usage moves away from broadcast only based viewing measurement organizations such as Nielson, as well as theater ticket sales. Additionally, real-time usage data, trends from the transaction audit trail created by this system, would enable the user real-time Nielson like rating for feedback to the content owners, retailers OEMs etc. The player with the TIRIS system can be polled real-time (through the two-way communication link of the network card) to provide appropriate advertising feeds to that target audience. This is an extra benefit to the advertisers for product branding, promotions, etc.

An additional feature for the DVD or media player owner would be to utilize the TIRIS transponder information along with media based information to create a personal media content library management function.

To further protect the integrity of the security scheme, the TIRIS reader/interrogator function and the matching process must be completed internally i.e. on the internal communications bus of the interrogation IC. The Motion Pictures Expert Group (MPEG) decoder could also be located within the intelligence of the media player as well, so that attempts to break the code and to defeat the protection would be extremely difficult. Integration of the TIRIS interrogator/reader and MPEG decoder on a single IC chip is highly desirable since such configurations would help assure copyright protection.

In the event of a successful authentication, the usage and other user-bit counters, and the writable elements of the transponder can be accessible in the value chain, such as retailers, resellers, end-users and content providers or their agents, i.e. intellectual property/royalty collection third parties or agents, etc. In the event of a "branded" content non-match of authenticity, the DVD player could indicate detection of an "unauthorized program copy". The TIRIS reader then would switch to a prerecorded copyright warning/notice location, possibly stored as an on screen display (OSD) message.

For high end applications i.e. using read/write, multipage transponder, inventory control, logistic and retail management functionality is possible, with implementation benefiting retailers, equipment manufacturers (hardware OEMs), resellers and redistributors also a reality. The "prelocated origin data" such as the date/place of manufacture, edition/catalogue numbers, may be embedded and encrypted into the DVD to provide excellent legacy system over-ride for older already owned legitimate media. The upcoming DVD players are expected to be able to differentiate between various media types.

If the media type is determined to be an earlier type (as in music CDs or CD ROMs), the DVD player/TRIS reader of course would not need to decode an MPEG data stream and therefore would allow normal playback of such material. In the alternative case of an original and genuine non-TIRIScypher DVD media, (i.e. in circulation before TIRIS cypher encrypted material), the player/reader would detect earlier type excluded DVD embedded date-codes and grant a limited number of play accesses. Beyond this number of plays, (tracked with run counter in transponder user-bit data field, see FIG. 1), a trade-in and upgrade message could be displayed for the purchase of conforming media.

This scheme would effectively deliver pirated media material to the copyright owners for further action and allow legitimate owners to have their material conformed, while supplying valuable demographic information to copyright owners. The foregoing combination of hardware, firmware/software sub-system methodology may be referred to as the "TIRIScypher subsystem" for copyright protection of branded content.

Figure 2:
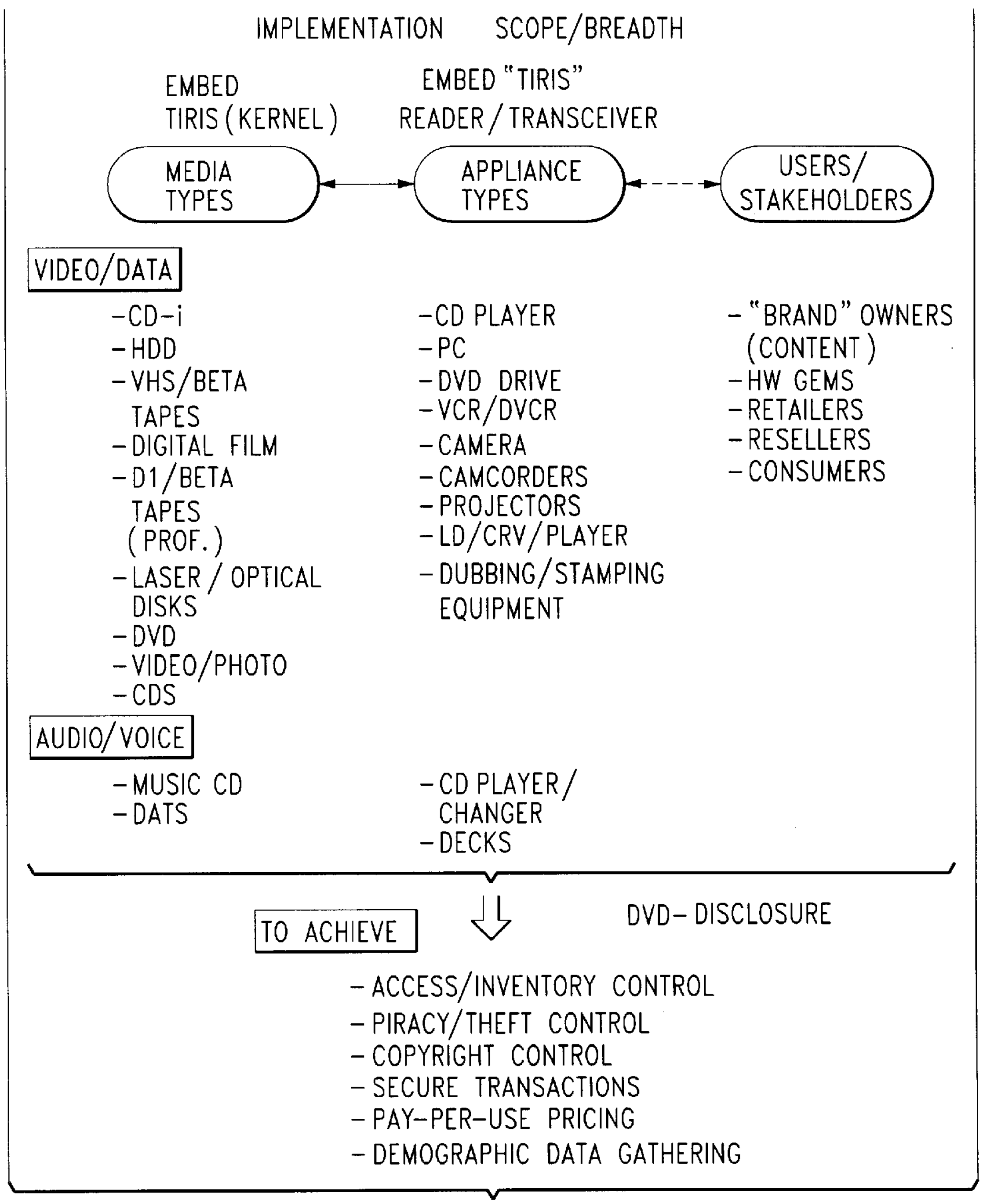
FIG. 2 provides a table of the potential scope/breadth of the invention in different areas of technology.

The invention outlined below addresses the copyright and secured access protection issues for the DVD, next generation compact/optical disks, which would essentially be storing high value, high quality, digitally compressed content. For the purpose of simplicity, the discussion here is limited to DVD type material only, however, the scope of the invention herein is much broader, which may include other packaged media types with associated players/appliances, as has been outlined in FIG. 2. In addition, the transponder could have read-only or read/write capability, with single or multiple page capacity with the cost constraints and/or system requirements actually defining those parameters.

I claim:

1. A method of insuring only copyrighted material is playable or usable in any digital media system comprising the steps of:

integrating a radio-frequency interrogator with a media player for transmitting an interrogation signal to a transponder and for receiving a transponder response signal in response;

attaching a transponder to a predetermined media element wherein said transponder transmits a transponder response signal comprising a codeword and a predetermined address associated with said predetermined media element to said interrogator in response to said interrogation signal;

receiving a transponder response signal and providing said predetermined address to said media player;

reading said dataword at said predetermined address;

comparing said dataword and said codeword and authorizing the play or use of said media element upon a match of said dataword and said codeword.

2. The method according to claim 1, wherein said codeword and said predetermined address are programmed into the transponder memory at the manufacturing level.

3. The method according to claim 1, wherein said codeword and said predetermined address are programmed into the transponder at the customer level.

4. The method according to claim 1, wherein said at least one of said codeword and said predetermined address are encrypted by the transponder.

5. The method according to claim 2, wherein said comparing of said codeword and said dataword is performed within the same integrated circuit.

6. The method according to claim 1, wherein said comparing is accomplished through a look table.

7. The method according to claim 1, wherein said comparing is done directly.

8. The method according to claim 1, wherein said comparing is performed through an algorithm.

* * * * *